MATRIX MEMORY DEVICE WITH CONDUCTORS OF WHICH SOME HAVE MAGNETIC THIN FILM COATING
Filed July 1, 1964

INVENTOR.
Hisao Maeda

BY

Martin & Martin

United States Patent Office 3,432,825

Patented Mar. 11, 1969

3,432,825

MATRIX MEMORY DEVICE WITH CONDUCTORS OF WHICH SOME HAVE MAGNETIC THIN FILM COATING

Hisao Maeda, 211 Minamisenzoku-machi, Ota-ku, Tokyo-to, Japan; Hisaaki Maeda, heir of said Hisao Maeda, deceased Filed July 1, 1964, Ser. No. 379,505

Claims priority, application Japan, July 3, 1963, 38/34,920

U.S. Cl. 340—174 2 Claims

Int. Cl. G11b 5/00

ABSTRACT OF THE DISCLOSURE

A matrix memory device has a woven fabric composed of conductor warps for transmitting word drive current, and magnetic film plated conductor wefts for transmitting digit pulses, and magnetic warp wires arranged between the word drive conductors.

This invention relates to magnetic memory devices and more particularly to magnetic memory devices of the type comprising a magnetic matrix of woven conductors having coatings of a magnetic material.

This invention relates to a device for decreasing the reluctance of the magnetic circuit for word driving currents flowing through a matrix memory device of the type above referred to, thereby to decrease the driving currents and also to prevent mutual interference between adjacent bits, thus further facilitating the miniaturization of the device.

Further objects and advantages of the present invention will become apparent, and this invention will be better understood from the following description, reference being made to the accompanying drawing, in which like parts are designated by like reference characters, and in which:

FIG. 1 indicates the principle of a magnetic memory device comprising a conductor having a coating of a magnetic material;

Figure 4I:
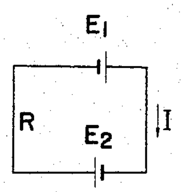
Figure 4:
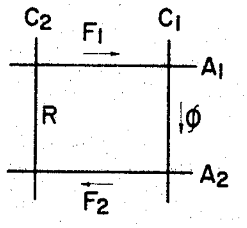

FIG. 4(I) and 4(II) show equivalent electric and magnetic circuits helpful for understanding the principle of this invention.

In order to more fully indicate the nature of this invention, a simple description will first be presented in connection with a magnetic matrix memory device comprising woven conductors having coatings of a magnetic material.

Generally, this type of magnetic matrix memory device is fabricated to have from several hundreds to several thousands bits by interweaving a plurality of wefts consisting of conductors A each having a coating of a magnetic material (for brevity, hereinafter referred to as a "plated wire") and warps consisting of conductors B, each of said wires A consisting of a core 1 made of a nonmagnetic material such as copper, molybdenum and the like, and a coating of a magnetic material such as permalloy deposited thereon by such a method as electrical or chemical plating. In this case, suitable spacer wires may be interwoven with the wefts and/or warps. In any construction of this nature, as it is necessary to insulate conductors A and B from one another, at least one of them should be provided with a coating of an insulating material. While it is possible to utilize the plated wires A as the warps and the conductors B as the wefts, the following description is based on the assumption that the wefts comprise the wires A, and the warps comprise the conductors B.

As is well known in the art, when a word driving pulse $I_w$ is passed through a conductor B, and a digit pulse $I_d$ is passed through a plated wire A, the direction of magnetization of the magnetic coating or film 2 at the crossing point between these conductors will be changed, whereby a memory digit 1 or 0 can be stored in the magnetic film depending upon the direction of magnetization or stored memory can be read out dependent upon the sign (positive or negative) of an output produced by the change in the direction of magnetization.

Since the magnetic film 2 is continuous, however, decrease in the spacing between adjacent magnetic points or the bit spacing *b* will result in the possibility of the occurrence of mutual interference between the adjacent magnetic points. As a consequence, it has been necessary to make the bit spacing *b* to have a value greater than a ceratin limit (in prior devices this should be at least about 3 to 4 mm. or more), hindering miniaturization of the products.

Moreover, as the magnetic flux produced by the word driving pulse $I_w$ must flow through the surrounding air, it is necessary to pass a considerably large driving pulse in order to write in current information. This also contributes to the mutual interference between the adjacent magnetic points.

Where the digit pulse $I_d$ is equal to 50 milliamperes, for example, it is necessary to make the word driving pulse $I_w$ equal to about 1 ampere. In this condition, it is necessary to make the minimum bit spacing *b* equal to at least 4 mm.

This invention contemplates the provision of a closed magnetic circuit, wherein magnetomotive forces having opposite directions are added to one another by utilizing the phenomenon in a woven fabric type memory device whereby each of the warp conductors B is made to pass alternately around the front side and the back side of the weft plated wires A, in other words, whereby the magnetomotive force due to the word driving pulse $I_w$ flowing through the conductor B is made to flow in the opposite directions through alternate weft plated wires A.

Figure 1:
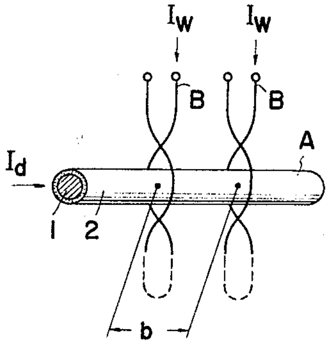
Figure 2:
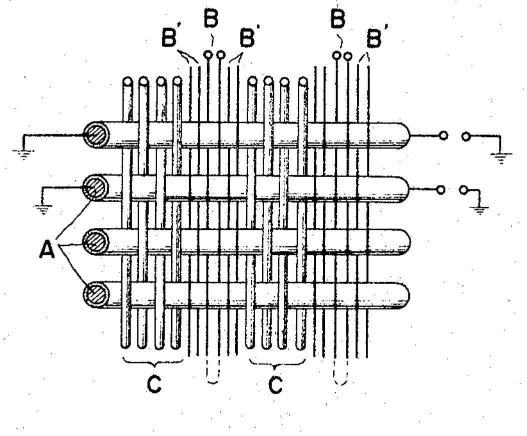
FIG. 2 is a schematic representation of one embodiment of this invention.

More particularly, a unique feature of this invention resides in a matrix comprising a woven fabric consisting of warps including groups of suitably spaced parallel word driving line conductors B and suitable number of magnetic wires C interposed between said groups of driving line conductors, and wefts including a suitable number of conductors A having coatings of a magnetic material to act as the digit lines, as shown in FIG. 2. In certain cases, suitable spacer wires may be included in the warps. Thus, a number of closed magnetic circuits are formed by warp magnetic wires C and the weft conductors A having coatings of a magnetic material wherein electromotive forces created in the respective closed magnetic circuits by the word driving current flowing through the conductors are added to one another.

It should be understood, however, that weft conductors A having magnetic coatings must be electrically insulated from the warp conductors B and the magnetic wires C so that either B and C or A must be provided with the coatings of insulating material.

While the magnetic wires C may be simple wires made of magnetic material, it was found that core conductors made of nonmagnetic or diamagnetic material and having thin coatings of a ferromagnetic material, such as plated wires A, are suitable for high speed operation.

When a suitable number of insulating spacer wires or magnetic wires are interwoven with the weft plated wires A, all of the wefts may be comprised solely of plated wires, and suitably spaced plated wires may be utilized as the digit lines, while the remaining wires may be comprised of magnetic wires.

In this way this invention provides memory points having uniform characteristics. Further, in order to prevent damage to the neighborhood of the memory point, several warp conductors B may be arranged side by side to use only the intermediate conductors as the word driving lines, and the remaining conductors B′ are used as spacers. Also among magnetic wires C, those situated near the conductors B may be made thin and flexible.

Dotted lines in FIG. 2 connected to the ends of adjacent conductors B show connections to form one turn coils which are to be made after weaving. However, it will be also clear that coils having several turns can be formed by similar end connections.

Figure 3:
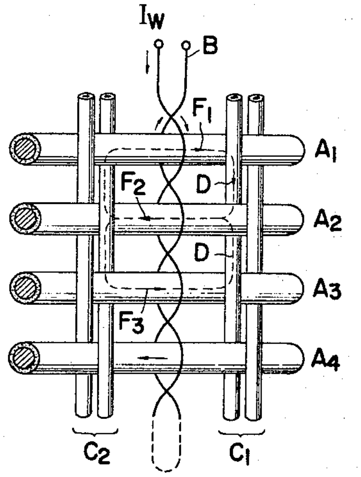
FIG. 3 is an enlarged view of a portion of the matrix shown in FIG. 2.

FIG. 3 shows a greatly enlarged view of a portion of the matrix shown in FIG. 2 to facilitate clear understanding. If it is assumed now that a magnetomotive force $F_2$ which is directed toward the left is created in the plated wire $A_2$ by a word driving pulse $I_w$ flowing through the conductor B, electromotive forces $F_1$ and $F_3$ which are directed toward the right will be induced in the adjacent plated wires $A_1$ and $A_3$.

Thus, it will be observed that closed magetic circuits D are formed by a plated wire $A_2$, magnetic wires $C_1$, a plated wire $A_3$ and magnetic wires $C_2$ or by similar conductors $A_2$, $C_1$, $A_1$ and $C_2$, and that the magnetomotive forces induced in the respective closed magnetic circuits are added to one another.

This is equivalent to a closed electrical circuit shown in FIG. 4(I) wherein two electric sources of voltages $E_1$ and $E_2$ are connected serially with the same polarity. The current I flowing through this circuit can be represented by $$I=E_1+E_2/R$$

where R denotes the resistance of the closed circuit. Thus, considering two adjacent plated wires $A_1$ and $A_2$ as shown in FIG. 4(II), the magnetic flux flowing through this closed magnetic circuit can be represented by $$\Phi=F_1+F_2/R'$$

where R′ denotes the reluctance of the closed magnetic circuit.

Thus, according to this invention, the reluctance R′ is greatly reduced by forming closed magnetic circuits so that, for a fixed value of Φ, the magnetomotive force can be reduced. Moreover, as the magnetomotive forces are added to one another, even a very small word driving pulse $I_w$ can provide efficient operation.

The diameter of the warp magnetic wire C is made larger than that of the conductors B in order to ensure good contact with the plated wires so as to decrease the reluctance of the magnetic circuit. It is also to be understood that the magnetic wires C are made to have isotropic property or easy axes in their longitudinal direction in order to further decrease the reluctance.

Reduction of word driving pulse $I_w$ not only contributes to economical consumption of electric power but also decreases mutual interference between adjacent memory points as well as bit spacings, thus reducing the size of the product. Furthermore, in accordance with this invention, since the magnetic flux associated with the pulse $I_w$ tends to flow through the closed magnetic circuit regardless of the continuity of the magnetic film on the plated wire A, the magnetic flux which flows through one magnetic circuit does not flow through adjacent magnetic circuits. Of course, the greater the number of magnetic wires C between memory points, the greater is the above described effect, which means that more uniform magnetic characteristics can be assured.

The above-mentioned numerous closed magnetic circuits can be easily formed by merely interweaving magnetic wires with warps. Thus, the magnetic memory device of this invention can be manufactured at low cost by mass production processes.

While the invention has been explained by describing particular embodiments thereof, it will be apparent that improvements and modifications may be made therein without departing from the scope of the invention as defined in the appended claims.

What is claimed is:

1. In a matrix memory device, the combination with a woven fabric formed by warps and wefts, said warps comprising spaced groups of conductors which serve as word drive lines passing word drive current therethrough, and said wefts comprising plated conductor wires each including a conductor and a magnetic film coating plated on said conductor and having easy axes of magnetization in the peripheral direction of the conductor, and said plated conductor wires serving for passing digit pulses therethrough, whereby information signals are written in the cross points of said warps and wefts, of a plurality of other magnetic wires interposed, as other warps, between said word drive lines, whereby the magnetomotive force produced in any of said plated conductor wires and that produced in the adjacent plated conductor wire when a word pulse current is passed through the word drive wires, the directions of said magnetomotive forces being reverse relative to each other, are mutually superimposed through said other magnetic wires.

2. The magnetic memory device according to claim 1, said warps also containing spacer lines interwoven with said wefts.

References Cited

UNITED STATES PATENTS

| | | | |
|---|---|---|---|
| 3,221,312 | 11/1965 | MacLachlan | 340—174 |
| 3,286,242 | 11/1966 | Gianola | 340—174 |
| 3,309,681 | 3/1967 | Boles et al. | 340—174 |

BERNARD KONICK, *Primary Examiner.*